E. R. CARICHOFF.
MOTOR CONTROL SYSTEM.
APPLICATION FILED FEB. 19, 1912.
1,037,433.
Patented Sept. 3, 1912.
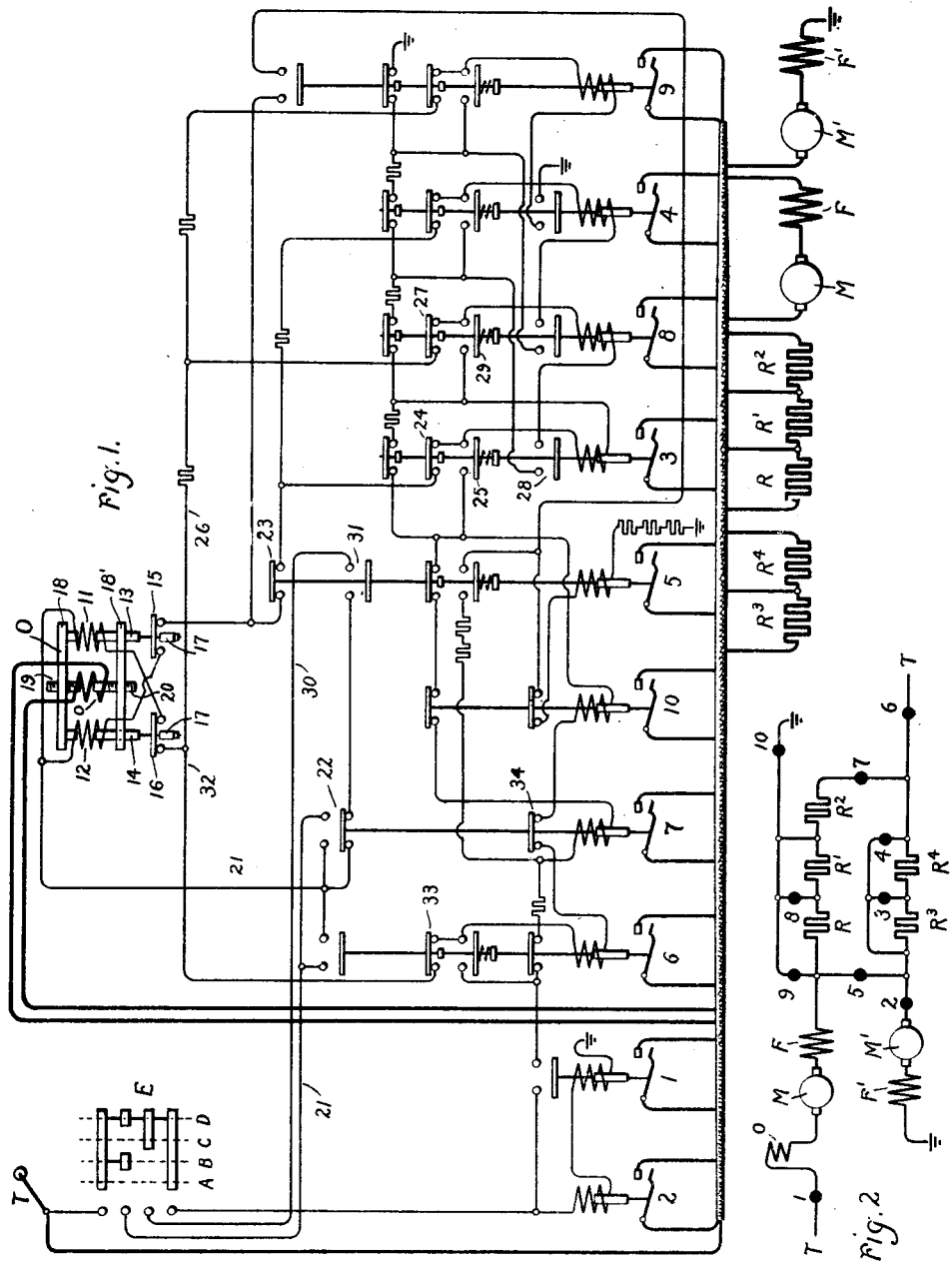
Witnesses
Inventor.
Eugene R. Carichoff.
by
His Attorney.

UNITED STATES PATENT OFFICE.

EUGENE R. CARICHOFF, OF SCHENECTADY, NEW YORK, ASSIGNOR TO GENERAL ELECTRIC COMPANY, A CORPORATION OF NEW YORK.

MOTOR-CONTROL SYSTEM.

1,037,433.  Specification of Letters Patent.  Patented Sept. 3, 1912.

Application filed February 19, 1912. Serial No. 678,551.

*To all whom it may concern:*

Be it known that I, EUGENE R. CARICHOFF, a citizen of the United States, residing at Schenectady, in the county of Schenectady, State of New York, have invented certain new and useful Improvements in Motor-Control Systems, of which the following is a specification.

This invention relates to the control of electric motors and has for its object the provision of means whereby a plurality of motors will be started and brought to running speed in a reliable, simple and efficient manner.

My invention relates more specifically to the control of electric motors on what is known as the series parallel system. With this system of control a plurality of motors are connected in series with each other and with a starting resistance, after which the resistance is gradually cut out and the motor is connected in parallel with part of the resistance in series with each motor. This resistance is then cut out and the motors are connected in full parallel. These steps have in the past been accomplished generally by a controller which is operated in any desired manner, having contacts mechanically fixed with reference to each other so as to cause the necessary connections to be made when the controller is rotated. These connections have also been made by the use of a plurality of contactors which are arranged to operate successively to cause the necessary steps to be taken to bring about this result. These steps are commonly performed under the control of a master controller in the hands of the operator, this master controller controlling the circuits of the various contactors.

In my previous application, Serial No. 504,321, I have disclosed means for causing a time interval between the closing of the contactors. This arrangement broadly stated, covers what is known as a two wire notching relay, the arrangement being such that a pair of relays operate alternately under the control of a time limit device such as a dashpot to cause the contactors to be actuated successively with a predetermined delay between the operation of the successive contactors. These relays are likewise under the control of the master controller so that a predetermined time elapses between the actuation of the successive contactors, but the actuation also depends upon the current being below a predetermined safe value. In my later application Serial No. 643,086 I have shown another form of two wire notching mechanism constituting a combined time limit mechanism in which the effect of the retarding mechanism or dashpot is varied by the current. In carrying out my present invention I have applied this two wire notching relay to a series parallel system arranged in such a way as to secure the maximum efficiency of operation combined with the minimum number of working parts. In this invention I have shown the type of two wire notching relay disclosed in my last mentioned application. It is obvious, however, that my invention is in no sense limited to this particular relay construction, nor in fact limited to any particular means for causing the retardation and energizing of the various contactors.

In previous systems of series parallel control of the contactor type on the first step of the master controller a number of the contactors close to connect the two motors in series with each other and in series with the starting resistance. In the next position of the master controller, the circuits are made whereby certain of the contactors are automatically actuated under the control of the relay mechanism so as to cause a delayed progression of the contactors to successively cut out the sections of the starting resistance. After the last contactor closes to cut out the last section of resistance another contactor closes to establish a full series or what is known as a bridge connection. The closing of this bridging contactor breaks the holding circuit for all of the resistance contactors and causes them to open. As soon as the bridging contactor lifts and the resistance contactors have dropped out, the parallel contactors close to connect the motors in parallel. There is, however, no delay between the closing of the bridging contactor and the closing of the parallel contactors so as to insure the dropping out of the resistance contactors. When the parallel contactors are closed, the actuating circuit of the first resistance contactor is closed so that ordinarily there would be no delay between the closing of the parallel contactor and the cutting out of the first resistance step. In order to overcome this difficulty it has been the custom in the past to use one additional contactor which is the contactor short circuiting the last section of resistance simply for the purpose of causing this delay. In carrying out my present invention I eliminate this extra contactor which cuts out the last section of resistance and causes the necessary delay between the establishing of parallel connections and the cutting out of the first resistance step by a novel arrangement in which the necessary delay is produced by a time limit relay and the extra contactor is eliminated. By my arrangement a delay is likewise caused between the establishing of the bridge contactor and the establishing of the parallel connections so as to insure the resistance contactors time to drop out.

Other objects and purposes of my invention will appear in the course of the following specification in which I have shown my invention embodied in concrete form for purposes of illustration.

In the accompanying drawing Figure 1 is a diagram showing the circuit connections of my complete system; Fig. 2 is a simplified diagram showing only the motor circuit connections to be read in connection with the key shown in Fig. 3 and Fig. 3 is a key of the various circuit connections.

In order to simplify the description of this system and to make it more easily readable I have shown the motor circuits in Fig. 2 associated with the ten contactors which are used in the system. These contactors are shown as round black dots numbered consecutively from 1 to 10. In the key shown in Fig. 3 these contactors are indicated in the same way and the number of contactors which are closed at each step is likewise shown.

Referring to Figs. 2 and 3 it will be seen that the contactors 1, 2 and 7 close on the first step. These steps do not correspond to positions on the master controller but simply combinations of contactors which successively occur. It will be seen by reference to Fig. 2 that the closing of the contactors 1, 2 and 7 causes the motors M and M' to be connected in series with the respective fields F and F' and in series with the resistance sections R, R', $R^2$, $R^3$ and $R^4$. The overload relay O is likewise connected in this circuit. The next step, it will be seen from the key, causes the contactor 3 to close which short circuits the resistance section $R^3$. On the third step contactor 8 closes, thereby short circuiting the resistance R'. On the fourth step the contactor 4 closes thereby short circuiting resistance $R^4$. On the fifth step the contactor 9 closes thereby short circuiting the resistance R. In this position the resistances are therefore all short circuited with the exception of $R^2$. On the sixth step contactor 5 closes, which short circuits all the resistance including resistance $R^2$. This also deënergizes all the other resistance contactors and allows them to drop out. In this position the motors will be in full series. On the seventh step the two contactors 6 and 10 are closed, thereby connecting the two motors in parallel. As soon as contactors 6 and 10 close the contactor 5 is opened thereby leaving contactors 1, 2, 6 and 10 closed. With these contactors closed the motor M is connected across the line in series with resistance R R' and the motor M' is connected across the line in series with resistances $R^3$ and $R^4$. On the eighth step contactor 3 closes to short circuit resistance $R^3$. On the ninth step the contactor 8 closes to short circuit resistance R'. On the tenth step contactor 4 closes to short circuit resistance $R^4$ and on the eleventh step contactor 9 closes to short circuit resistance R. The two motors are now connected across the line in parallel with each other and with no resistance in circuit, that is, the motors are in the normal running condition.

The above is a description of the various arrangements of the motor circuits and it will therefore be unnecessary to describe these motor circuits in connection with Fig. 1. The description of Fig. 1 will be confined to the arrangements whereby the various contactors are controlled. In Fig. 1 the contactors are numbered to correspond with the numbering in Figs. 2 and 3. The master controller E has four positions A, B, C and D through which the trolley T is connected to various contactors. The relay mechanism O is of the type disclosed in my application Serial No. 643,086. This mechanism consists of two relay windings 11 and 12 each provided with cores or plungers 13, 14, respectively, having at their lower end contacts 15 and 16. Each plunger is retarded in its downward movement by a dashpot 17 and is quickly moved upward by its coil. There is a common magnetic frame for the two relays consisting of the parallel bars 18 and 18' through which pass the two adjustable cores 19 and 20 of the overload coil $o$. The cores 14 and 13 are movable through the lower bar 18' so as to make contact in their lower position, and in their upper position to abut against a stop. The contacts of one relay coil control the coil of the other relay so that as soon as the core of one rises it opens the circuit of the other coil. The arrangement is such that when one coil, say, for instance, coil 12, is energized, its core 14 rises quickly and opens the circuit of the coil 11 at the contact 16. The return movement of this contact is under the control of the dashpot and of the current coil o. Upon the deënergization of the coil 12 the core 14 will start to drop retarded by the dashpot and also retarded by the flux generated by the current in the series coil o, the retardation depending, therefore, upon the current. When the current falls below a predetermined safe value the core will drop and energize the coil 11. In like manner, when the core of coil 11 is pulled up it subsequently drops under the time and current retardation. Each relay as it drops completes the circuit of one or more contactors so that the contactors will be energized successively with a time interval depending upon the current between the successive energizations.

Referring now to Fig. 1, it will be seen that when the master controller E is moved to the first position, which is shown as position A, current passes from the trolley T through the windings of contactors 1 and 2 to ground G. When contactor 1 closes it energizes the winding of contactor 7 so that in the position A contactors 1, 2 and 7 are closed. This, it will be seen from Fig. 2, connects the motors and resistances in series. When the controller is moved to position B wire 21 is energized, a circuit passing through the trolley through wire 21, through the interlocking contacts 22 on the contactor 7, through the coil 12 of the relay O, through contact 15 on the core of coil 11, thence through interlock 23 on contactor 5 through the interlock 24 on contactor 3, through the energizing winding of contactor 3, and thence to ground through the upper interlocks on contactors 8, 4 and 9. This causes the contactor 3 to close thereby cutting out section of resistance R³. The closing of the contactor 3 establishes a holding circuit through the interlock 25 and breaks its energizing circuit at the interlock 24. The breaking of the energizing circuit causes the winding 12 to be deënergized thereby allowing its core 14 to drop under the control of the current and the dashpot. When the current falls to a proper value due to the speeding up of the motors, the core 14 will complete a circuit through the coil 11. The energizing current will now pass from the wire 21 through the coil 11 and contacts 16, thence through wire 26 to the interlock 27 on contactor 8, thence through the energizing winding of contactor 8 and through the interlock 28 of contactor 3 and back to ground. It will be noted that the closing of contactor 3 made it possible for the contactor 8 to close. The closing of contactor 8 short circuits the section of resistance R'. In like manner, when the contactor 8 closes it opens its own energizing circuit at the interlock 27 and completes a holding circuit through interlock 29. This causes the winding 11 to be deënergized, thereby permitting the plunger 12 to drop as before until it finally completes the circuit at contact 15. In this way the two plungers 13 and 14 operate alternately under the control of the current in the motor circuit to complete the circuit of the successive contactors. It will be understood that each contactor as it closes makes it possible for the succeeding contactor to be energized. The next contactor to be closed is contactor 4 which short circuits a section of resistance R⁴ and this is followed by the closing of contactor 9 which short circuits section of resistance R. Following the closing of contactor 9 contactor 5 closes which establishes full series. The contactors 3, 4 and 5 are therefore energized through the contacts on core 13 of the relay and contactors 8 and 9 are energized through the contacts on the core 14. The motors are now in full series position, the first six steps shown on Fig. 3 having been taken. When the master controller is moved to the position C the wire 30 will be energized. The energizing current from wire 30 will therefore pass through the interlock 31 on contactor 5 to interlock 22 on contactor 7, thence to wire 21 and the winding 11, contacts on the core 14, wire 32, interlock 33, winding of contactor 6, interlock 34, winding of contactor 10, and back to ground. The closing of contactors 6 and 10 make the parallel connections of the motor, and the closing of contactor 10 deënergizes contactor 5 and causes it to open. It will be seen that between the closing of the contactor 5, which caused the opening of the other resistance contactors, and the closing of contactors 6 and 10, which made the parallel connections, there is an interval caused by the delay in the relay O, thereby insuring that the contactors will be in their full open position before the parallel connections are made. Contactors 1, 2, 6 and 10 are now closed and the motors are connected in parallel. Contactor 7 being open, resistance R² is not in circuit, but resistances R and R' are in series with the motor M while the resistances R³ and R⁴ are in series with the motor M'. When now the master controller is moved to position D the wire 21 which is deënergized in the position C is again energized, thus causing the resistance contactors to again close in progression. As above, the first contactor to close is contactor 3 which short circuits the section of resistance R³. It will be noted that there is also an interval between the closing of the parallel connections 6 and 10 and the closing of the first resistance contactor 3. Furthermore, this delay is brought about without the additional contactor, as has been the practice heretofore. This is one of the important features of my arrangement.

Following the closing of contactor 3 contactors 8 and 9 and 4 will be closed successively until finally contactors 1, 2, 3, 4, 6, 8, 9 and 10 are closed. This places the two motors in parallel across the line with no resistance in circuit. It will be noted that by this arrangement I have eliminated a contactor which has heretofore been used for short circuiting the resistance R². As above stated, this contactor was not necessary heretofore in order to cut out the series resistance since the closing of contactor 5 brought about this result. The extra contactor was, however, necessary in order to cause a time interval between the closing of the parallel contactors and the cutting out of the first section of resistance. The extra contactor has heretofore been caused to close immediately upon the closing of contactors 6 and 10 and made a circuit for the contactor 8. This produces a slight time interval preceding the closing of the first resistance contactor. By my present arrangement, however, by carrying the energizing circuit of contactors 6 and 10 through the relay mechanism I am able to produce the desired delay preceding the closing of the first resistance contactor without the additional contactor and likewise produce a delay between the closing of contactor 5 and the closing of contactors 6 and 10 so as to give the resistance contactors time to get fully open.

While I have described my invention as embodied in concrete form, it should be understood that I do not limit my invention thereto except as it is limited by the scope of the claims annexed hereto.

What I claim as new and desire to secure by Letters Patent of the United States, is:—

1. In a series parallel system of motor control, a pair of motors and sections of resistance therefor, a plurality of contactors, a master controller arranged to energize certain of said contactors to connect the motors and resistances in series, a relay mechanism for controlling the energization of certain of said contactors to produce a time interval between the successive energizations, and connections whereby said contactors successively close under the control of said mechanism in delayed progression to first cut out the resistance in series position then after the proper interval to establish parallel connections and finally after another interval to cause the resistance contactors to again operate to cut out the resistance in the parallel position.

2. In a series parallel system of motor control, a pair of motors and sections of resistance therefor, a plurality of contactors, a master controller arranged to energize certain of said contactors to connect the motors and resistances in series, a combined time and current limit relay mechanism for controlling the energization of certain of said contactors to produce a time interval between the successive energizations thereof, and connections whereby said contactors succcssively close under the control of said mechanism in delayed progression to first cut out the resistance in series position and close the full series contactor, interlocking connections whereby the resistance contactors are opened when the full series contactor closes, and connections whereby parallel connections are established after the proper interval following the closing of the full series contactor and finally after the proper interval causing the resistance contactors to again operate to cut out the resistance in the parallel position.

3. In a series parallel system of motor control, a pair of motors and resistances therefor, a plurality of contactors, a master controller arranged to energize certain of said contactors in the first position to connect the motors and resistances in series, a two wire notching relay energized by the master controller in the second position to progressively actuate and give a time interval between certain other of said contactors including a full series contactor to cut out said resistance and establish full series there being only one contactor for each section of resistance cut out, interlocking connections whereby the resistance contactors open when the full series contactor closes, and connections through the relay in the third position of the master controller whereby certain other contactors are closed to establish parallel connections of the motors through all but the last section of resistance and open the full series contactor and in the fourth position to again energize the resistance contactors progressively through the relay to cut out the resistance connected in parallel.

4. In a series parallel system of motor control, a pair of motors and sections of resistance therefor, a number of contactors equal to twice the number of resistance sections, a master controller arranged to energize certain of said contactors in the first position to connect the motors and resistances in series, a relay mechanism energized by the master controller in the second position to progressively actuate and give a time interval between certain of said contactors including a full series contactor to cut out said resistance, interlocking connections whereby the resistance contactors are opened when the full series contactor closes and connections through the relay in the third position of the master controller whereby certain contactors are closed to establish parallel connections of the motor and open the series contactor and in the fourth position to again energize the resistance contactors progressively through the relay to cut out the resistance connected in parallel.

In witness whereof, I have hereunto set my hand this 16th day of February, 1912.

EUGENE R. CARICHOFF.

Witnesses.
 BENJAMIN B. HULL,
 HELEN ORFORD.